(12) United States Patent
Warner et al.

(10) Patent No.: US 11,440,711 B2
(45) Date of Patent: Sep. 13, 2022

(54) CHILD-RESISTANT, RESEALABLE CONTAINER

(71) Applicant: Assurpack LLC, Greenwood Village, CO (US)

(72) Inventors: Nancy Warner, Greenwood Village, CO (US); Jeremiah Buck, Wheat Ridge, CO (US)

(73) Assignee: ASSURPACK LLC, Greenwood Village, CO (US)

( * ) Notice: Subject to any disclaimer, the term of this patent is extended or adjusted under 35 U.S.C. 154(b) by 0 days.

(21) Appl. No.: 17/291,822

(22) PCT Filed: Nov. 25, 2019

(86) PCT No.: PCT/US2019/063017
§ 371 (c)(1),
(2) Date: May 6, 2021

(87) PCT Pub. No.: WO2020/112640
PCT Pub. Date: Jun. 4, 2020

(65) Prior Publication Data
US 2022/0009681 A1    Jan. 13, 2022

Related U.S. Application Data

(60) Provisional application No. 62/773,381, filed on Nov. 30, 2018.

(51) Int. Cl.
*B65D 51/18*    (2006.01)
*B65D 45/30*    (2006.01)
(Continued)

(52) U.S. Cl.
CPC ............. *B65D 51/18* (2013.01); *B65D 45/30* (2013.01); *B65D 45/305* (2013.01); *B65D 50/02* (2013.01);
(Continued)

(58) Field of Classification Search
CPC ...... B65D 51/20; B65D 51/145; B65D 43/00; B65D 50/00; B65D 51/00; B65D 53/00;
(Continued)

(56) References Cited

U.S. PATENT DOCUMENTS 3,860,136 A     1/1975  Romney
4,964,205 A  *  10/1990 Coffman ........... B29C 66/12423
                                                29/447
(Continued)

FOREIGN PATENT DOCUMENTS

WO     WO2019090095 A1    5/2019

OTHER PUBLICATIONS

PCT International Searching Authority/US, International Search Report and Written Opinion for PCT/US19/63017, dated Feb. 3, 2020.

*Primary Examiner* — James N Smalley
(74) *Attorney, Agent, or Firm* — John H. Choi & Associates

(57) ABSTRACT

A container and method include a bowl having an interior for storing a substance, an openable lower lid for accessing the substance when the lower lid is in an open configuration, and an upper lid for retaining the substance within the interior of the bowl and the lower lid. The lower lid in the open configuration is replaceable and resealable using an adhesive to be in a closed configuration, with the substance sealed within the bowl. The bowl, the lower lid, and the upper lid are composed of a biodegradable or recyclable material. A ring is disposed under a lip of the bowl and engageable with the upper lid for establishing a child-resistant engagement between the upper lid and the bowl. An intermediate lid pushes against an engagement surface of the bowl for locking the upper lid and the ring together.

18 Claims, 21 Drawing Sheets

(51) Int. Cl.
*B65D 50/02* (2006.01)
*B65D 65/46* (2006.01)
*B65D 51/20* (2006.01)
*B65D 51/14* (2006.01)

(52) U.S. Cl.
CPC ........... *B65D 51/145* (2013.01); *B65D 51/20* (2013.01); *B65D 65/466* (2013.01); *B65D 2251/005* (2013.01); *B65D 2251/0018* (2013.01); *B65D 2251/0071* (2013.01); *B65D 2251/0093* (2013.01); *Y02W 90/10* (2015.05)

(58) Field of Classification Search
CPC ............ B65D 55/00; B65D 2251/0093; B65D 2251/0018; B65B 7/2864; B65B 7/28
USPC .................................................. 215/222, 332
See application file for complete search history.

(56) References Cited

U.S. PATENT DOCUMENTS

| | | | |
|---|---|---|---|
| 5,209,184 A | 5/1993 | Sharkan et al. | |
| 5,819,968 A * | 10/1998 | Jones | B65D 50/043 |
| | | | 215/230 |
| 5,927,532 A | 7/1999 | Traub | |
| 5,967,350 A * | 10/1999 | Jones | B65D 51/245 |
| | | | 215/230 |
| 8,056,750 B2 | 11/2011 | Vovan | |
| 2003/0010781 A1* | 1/2003 | Odet | B65D 51/20 |
| | | | 220/259.3 |
| 2003/0192891 A1* | 10/2003 | Ziegler | A47G 19/2272 |
| | | | 220/717 |
| 2005/0109781 A1* | 5/2005 | Chasteen | B65D 51/28 |
| | | | 220/258.1 |
| 2005/0263524 A1 | 12/2005 | Meynier | |
| 2006/0201946 A1 | 9/2006 | Witt | |
| 2012/0318795 A1 | 12/2012 | Chameroy et al. | |
| 2014/0332536 A1 | 11/2014 | Grant | |
| 2015/0210442 A1 | 7/2015 | Frankel | |
| 2017/0107027 A1* | 4/2017 | Sangiovanni | B65D 51/20 |
| 2018/0148237 A1 | 3/2018 | Sibley et al. | |
| 2019/0059321 A1 | 2/2019 | Casale | |
| 2019/0241330 A1 | 8/2019 | Stoneberg et al. | |

* cited by examiner

CHILD-RESISTANT, RESEALABLE CONTAINER

CROSS-REFERENCE TO RELATED APPLICATION

This application claims priority to U.S. Provisional Application No. 62/773,381, filed on Nov. 30, 2018, which is incorporated by reference in its entirety.

FIELD

The present disclosure relates to containers and in particular to a lightweight, child-resistant, resealable container.

BACKGROUND

Lightweight packaging is advantageous for various applications, especially for storing lightweight materials such as medication and the like. In the prior art, such lightweight packaging includes formed foil packaging such as blister packaging. However, existing formed foil packaging is problematic because it can be easily crushed. Another problem is that such packaging in the prior art is for single use only. That is, once the material is removed from the blister, it cannot be reinserted. Thus, a need exists for lightweight packaging that is substantially stable and reusable.

Flexible pouches have been used to overcome the problems with existing formed foil packaging. However, flexible pouches are not uniform in shape and size, and therefore cannot be easily displayed, and also take up much needed space during transport and display. Therefore, a need also exists for a lightweight container that can be efficiently transported and displayed.

Containers with lids are known for retaining materials including foods, medication and other substances such as tobacco or other types of loose compositions. Some containers are sold with two layers of protection: a sealing film and a lid above the film, to preserve the contents within the container by having an airtight seal during transport and display. Sealing films are normally constructed of thin materials such as aluminum foil. Although the container is sealed airtight with the sealing film when the container is first purchased, once the sealing film is removed, it cannot be replaced on the container for retaining the materials therein airtight. Even though the removable lid could be used to retain materials within the container, an airtight seal cannot be accomplished. Therefore, a need exists for an airtight resealable container.

Furthermore, a user may desire that the contents within the container be inaccessible to children. Although containers in the prior art might have a child-resistant lid, such containers do not provide an airtight seal after first use. Therefore, a need exists for a child-resistant container with a resealable lid.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The present invention is a container with a replaceable lower lid composed of aluminum foil or other layer-like materials. The lower lid includes a means for resealing the container to provide a seal from moisture and air. An upper lid covers the lower lid and is child-resistant. Thus, the present invention provides a child-resistant, resealable container.

The present invention provides a container that is stable and rigid compared with other containers such as flexible pouches. As such, the container of the present invention could be efficiently transported and displayed while using less space. Furthermore, the container of the present invention is eco-friendly in that the container is constructed with bio-degradable and/or recyclable material. Moreover, the container of the present invention is easily crushed to a substantially flat configuration when discarded after use so that less space is taken up while storing and transporting for recycling. In addition, the present invention provides a child-proofing ring and an upper lid that are degradable as well as recyclable.

The present invention also provides pods or bowls that will nest ne in the other to take up less space during shipping and warehousing. The bowls of the present invention can be used to manufacture the containers of the present invention on high speed automated packaging lines as well as se machines. As well, additional supplements such as a nitrogen flush can be implemented with the auto hated packaging lines to keep the product within the container fresher and extend shelf life.

In one embodiment, the present invention is a container including a bowl having an interior for stor substance, an openable lower lid for accessing the substancethe lower lid is in an open configuration, and an upper lid for retaining the substance within the interior of the bowl and the lower lid. The lower lid in the open configuration is replaceable to be in a closed configuration wherein the substance is sealed within the bowl. The lower lid includes an adhesive for resealing the lower lid in an open configuration to be in a closed configuration. Each of the bowl, the lower lid, and the upper lid is composed of a biodegradable and/or recyclable material. The contamer includes a ring disposed adjacent to a portion of the bowl and engageable with the upper lid for establishing a child-resistant engagement between the upper lid and the bowl, and also includes an intermediate lid adjacent to a lower side of the upper lid, wherein the bowl has an engagement surface, with the intermediate lid pushing against the engagement surface for locking the upper lid and the ring together. The portion of the bowl includes a lip, and the ring is disposed. under the lip. The ring engages the lip in a friction fit. The ring includes a detent for engaging the lip in the friction fit.

In another embodiment, the present invention is a container including a bowl having an interior for storing a substance, an upper lid for retaining the substance within the interior of the bowl, and a ring disposed adjacent to a portion of the bowl and engageable with the upper lid for establishing a child-resistant engagement between the upper lid and the bowl. The container further includes an openable lower lid for accessing the substance when the lower lid is in an open configuration, wherein the lower lid in an open configuration is replaceable to be in a closed. configuration, wherein the substance is sealed within the bowl. The lower lid includes an adhesive for resealing the lower lid in an open configuration to be in a closed configuration. Each of the bowl, the lower lid, the upper lid, and the ring is composed of a biodegradable and/or recyclable material. The portion of the bowl includes a lip, and the ring is disposed under the lip. The ring engages the lip in a friction fit. The ring includes a detent for engaging the lip in the friction fit.

In a further embodiment, the present invention is a container including a bowl having an interior, an upper lid acting as an overcap for enclosing the interior of the bowl, with the upper lid having a tab, and a ring disposed adjacent to a portion of the bowl and having a detent forming a slot, wherein the tab engages the slot to lock the ring and the upper lid together. The tab is disposed on an underside of the upper lid. A downward force on the ring disengages the tab from the slot to unlock the ring from the upper lid.

BRIEF DESCRIPTION OF DRAWINGS

The foregoing summary, as well as the following detailed description of presently preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

Figure 1:
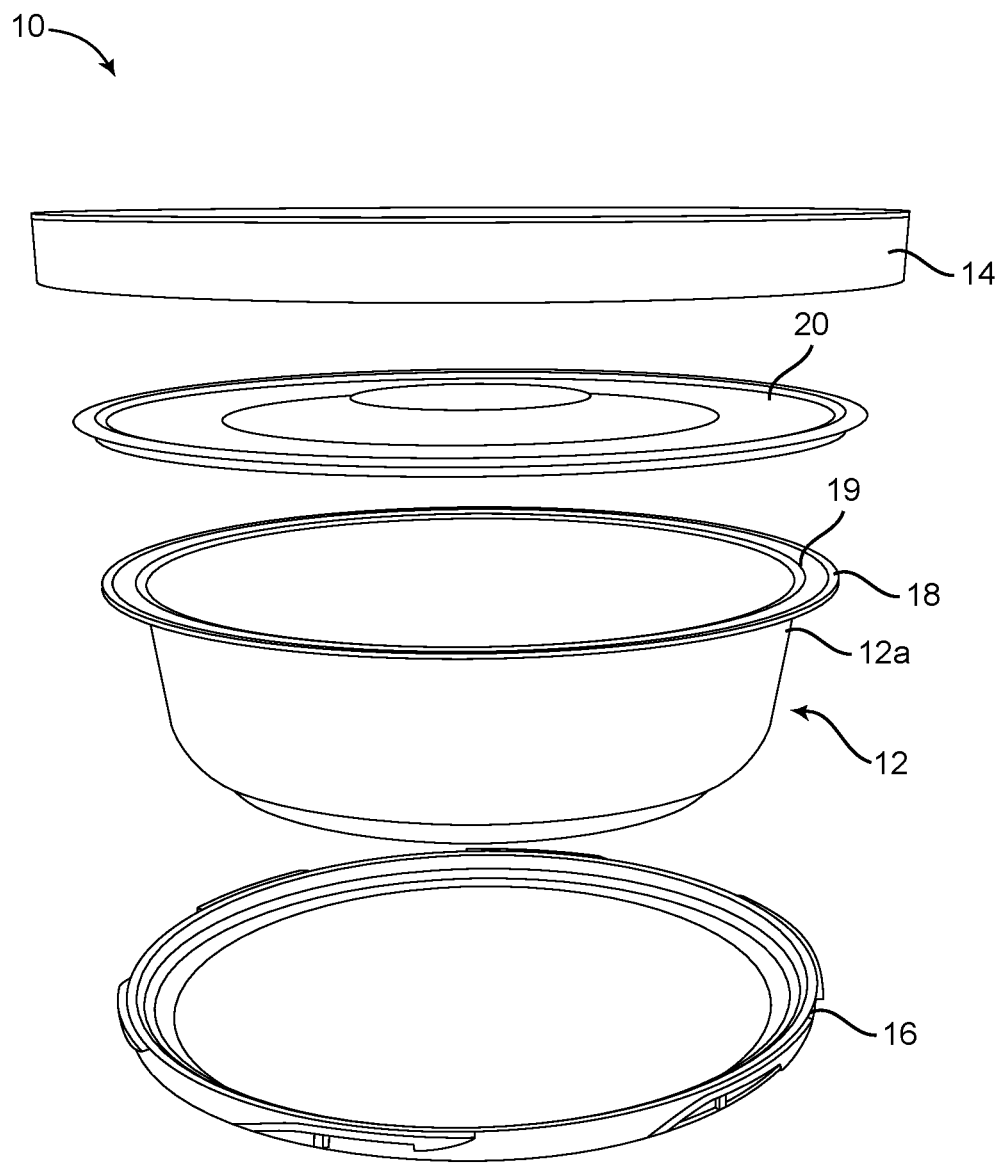
FIG. 1 illustrates a top front perspective view of a container of the present invention with parts separated and without a lower lid.

To facilitate an understanding of the invention, identical reference numerals have been used, when appropriate, to designate the same or similar elements that are common to the figures. Further, unless stated otherwise, the features shown in the figures are not drawn to scale but are shown for illustrative purposes only.

DETAILED DESCRIPTION

Certain terminology is used in the following description for convenience only and is not limiting. The article "a" is intended to include one or more items, and where only one item is intended the term "one" or similar language is used. Additionally, to assist in the description of the present invention, words such as top, bottom, side, upper, lower, front, rear, inner, outer, right and left may be used to describe the accompanying figures. The terminology includes the words above specifically mentioned, derivatives thereof, and words of similar import.

In general, as shown in the accompanying drawings, a container 10 of the present invention includes a bowl 12 operably coupled with a child-proofing ring 16, which is removably engaged with an upper lid 14. As shown in FIGS. 1-5, an intermediate lid 20 is positioned on the bowl 12 between the bowl 12 and upper lid 14. As shown in FIGS. 2 and 6-12, a lower lid 26 is positioned on the bowl 12 between the bowl 12 and upper lid 14. The container 10 may include the intermediate lid 20 and/or the lower lid 26 in various embodiments described herein. The container 10 with the aforementioned general components are shown throughout the figures in the various embodiments. One or more of the parts 12-26 of the container 10 may be composed of eco-friendly material such as biodegradable substances, eco-friendly plastic, etc. Furthermore, one or more parts 12-26 of the container 10 may be constructed of recyclable materials such as metal foil and plastics.

Figure 2:
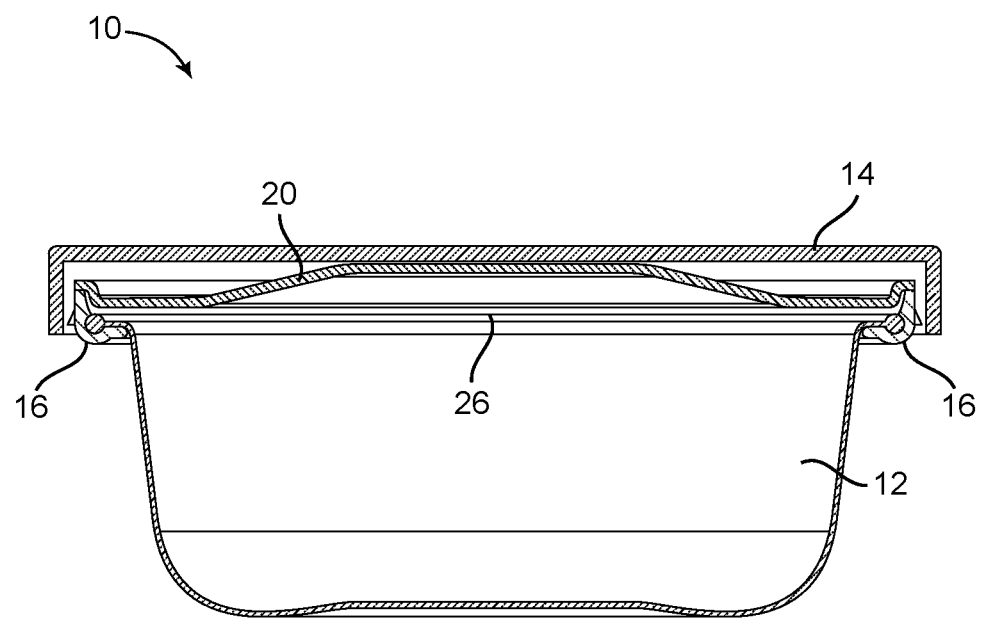
FIG. 2 illustrates a side cut-away view of an alternative embodiment of the container of the present invention having a lower lid.
Figure 3:
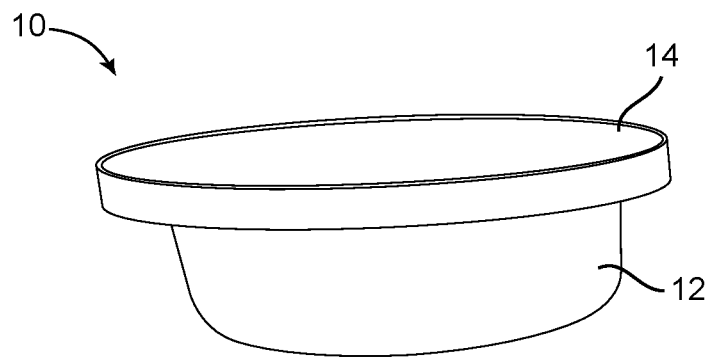
FIG. 3 illustrates a top front perspective view of the container of FIG. 2.

Referring to the figures, the container 10 of the present invention includes a bowl 12 for retaining substances. The bowl 12 may be constructed of a light but durable and recyclable material such as aluminum. However, other recyclable materials could be used, such as plastic and tin. The container 10 includes an upper lid 14 which acts as an overcap for engaging a child-proofing ring 16 which fits under a lip 18 of the bowl 12. As shown in FIG. 2, the ring 16 is friction fit with the lip 18 of the bowl 12 such that the ring 16 is fixed thereto.

Referring to FIGS. 2-12, the child-proofing ring 16 includes a plurality of detents 22, with a slot 23 formed within each detent 22. The upper lid 14 includes a plurality of complementary tabs 24 on an underside thereof for engaging corresponding detents 22. The number of detents 22 and corresponding tabs 24 could be varied. When locked, each tab 24 is positioned within a slot 23. To unlock, a user must push down on the upper lid 14 to provide a downward force on the ring 16 to disengage the tab 24 from the slot 23 to unlock the ring 16 from the upper lid 14, and then to rotate the upper lid 14, for example, counter-clockwise such that the tabs 24 are positioned below the detents 22 and the tabs 24 are released from the slots 23. The upper lid 14 and child-proofing ring 16 are constructed with a recyclable material such as plastic but other recyclable materials such as metals could be used.

Referring to FIG. 1, in one embodiment the intermediate lid 20 is provided for fitting between the upper lid 14 and the top of the bowl 12, and a lower lid 26 is not included. In an alternative embodiment, shown in FIGS. 2-12, the lower lid 26 is included. In FIG. 1, the bowl 12 includes an engagement surface 19 extending inwardly from the lip 18 and circumscribing an upper portion of the bowl 12. The lower lid 26 is constructed of a thin, flexible but durable and recyclable material such as plastic, paper, aluminum or tin film and includes a resealing adhesive on a bottom surface thereof along a radially outer portion of the intermediate lid 26. The reseal adhesive portion of the lower lid 26 engages the engagement surface 19 and is removably resealable. The lower lid 26 is a film laminated to the engagement surface 19, with the film of the lower lid 26 being resealable and providing an oxygen and moisture barrier.

Figure 4:
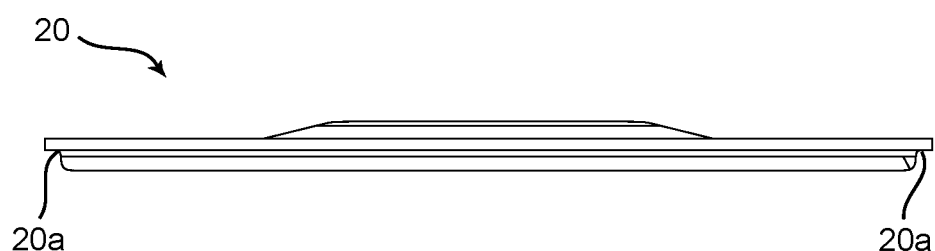
FIG. 4 illustrates a side plan view of an intermediate lid of the container of FIG. 2.
Figure 5:
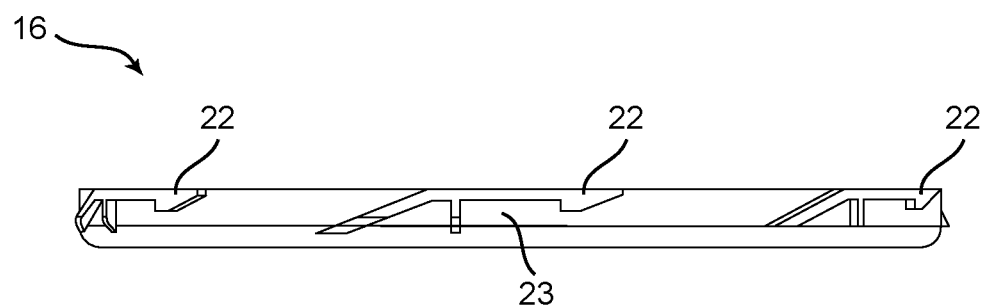
FIG. 5 illustrates a side plan view of a child-proofing ring of the container of FIG. 2.

As shown in FIGS. 2 and 4, the intermediate lid 20 is an insert that permanently stays in the upper lid 14; for example, the central top portion of the intermediate lid 20 is coupled to the underside of the upper lid 14 using adhesive or by injection molding. The intermediate lid 20 is flexible and has a degree of freedom of the bottom end 20a, shown in FIG. 4, such that pressure on the central top portion of the intermediate lid 20 from the upper lid 14 causes the intermediate lid 20 to act as a resilient member, such as a spring, which pushes against the engagement surface 19, locking the upper lid 14 and the ring 16 in place when aligned. That is, the bottom end 20a of the intermediate lid 20 (see, e.g., FIG. 4) is positioned above the lip engagement surface 19. The intermediate lid 20 may be composed of degradable material, and may form an airtight configuration. Alternatively, a foam or other soft material known in the art may be used to form an airtight configuration.

Referring to FIGS. 6-12, in another embodiment, a lower lid 26 extends across the top of the bowl 12, with the lower lid 26 being composed of a layer of aluminum or tin foil, paper or plastic material, or other known layers of recyclable material with the lower lid 26 completely covering the top of the bowl 12 to retain substances therein. In this embodiment, the engagement surface 19 of the bowl 12 includes an extended surface 21, shown in FIG. 8. A portion 28 of the lower lid 26 includes an adhesive, more specifically a reseal adhesive, disposed on a section 32 of a bottom surface of the portion 28 for rejoining the portion 28 to the engagement surface 19 to effectively close the lower lid 26 and resealing an interior 30 of the bowl 12 to provide an oxygen and moisture barrier. In this embodiment, the reseal adhesive is applied to a larger surface on the section 32, matching the extended surface 21, to provide a greater adhesive engagement area for added security. Therefore, using such portions 28 of the lower lid 26, the container 10 may be a multi-use device for retaining and resealing the substances stored therein.

Figure 9:
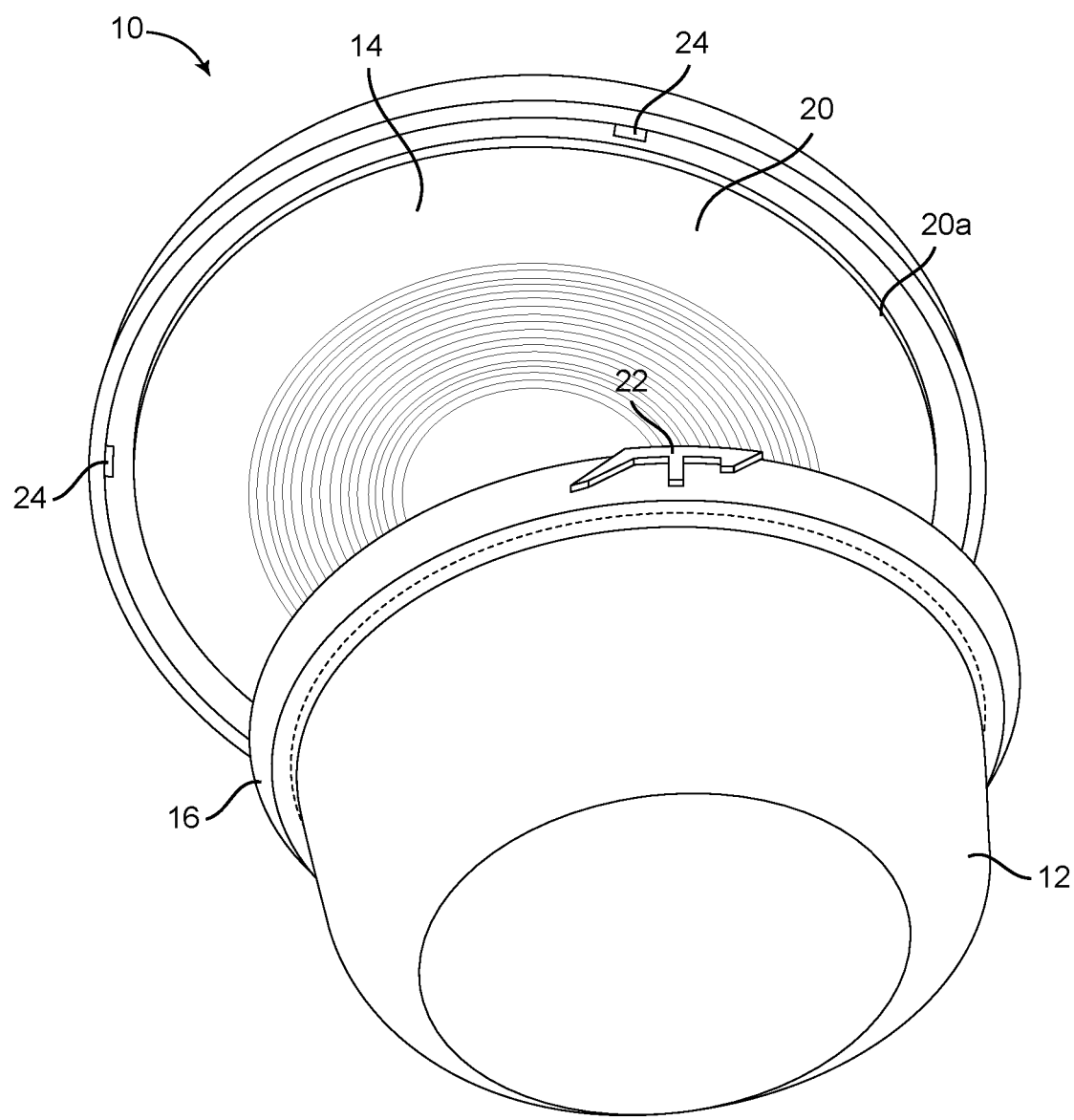
FIG. 9 illustrates a bottom side perspective view of the container of FIG. 2 in a partially assembled state.
Figure 10:
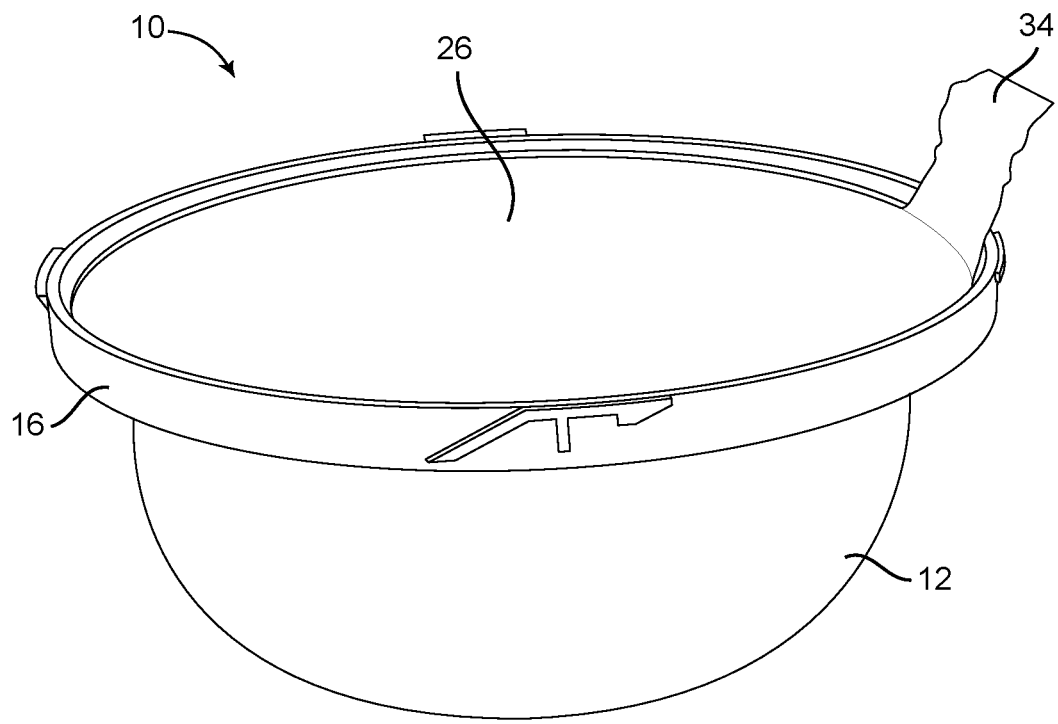
FIG. 10 illustrates the container of FIG. 9 with the upper lid removed and with a lifting tab on a lower lid.

Referring to FIGS. 9 and 10, the lower lid 26 could take on a wide range of shapes, sizes and designs. In this alternative embodiment, the lower lid 26 is provided with a lifting tab 34 for facilitating the grasping and pulling of the lower lid 26 to be lifted.

Figure 11:
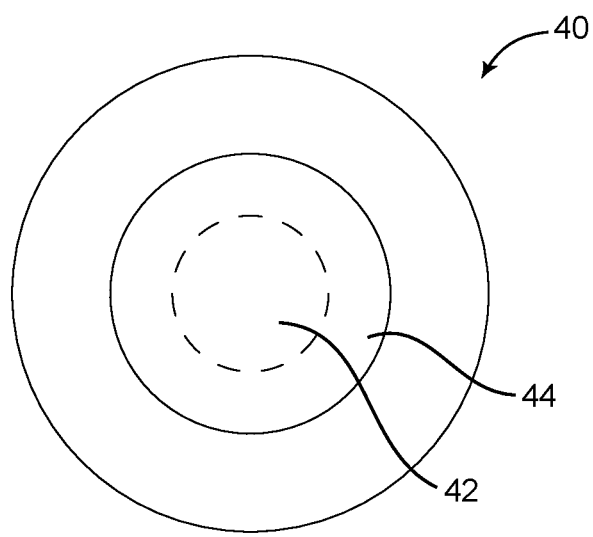
FIG. 11 illustrates an alternative embodiment of a lower lid of the present invention.

In another embodiment, as shown in FIG. 11, the container could include a lower lid 40 that is fixed to the engaging surface 19 of the bowl 12 with a permanent adhesive or integrally formed with the bowl 12. The lower lid 40 includes an aperture 42 that is covered with a removable cover 44 that includes a reseal adhesive on a bottom surface thereof for engaging with a top surface of the lower lid 40. In this embodiment, a user is capable of at least partially removing the cover 44 to access materials within the container 10 and reseal the container 10 by adhering the cover 44 back onto the lower lid 40.

The lower lid 40 and cover 44 combination could be manufactured through a converting process where existing flexible material making up the lower lid 40 is continuously fed through a conveyor belt. A pressure sensitive reseal label making up the cover 44 is applied to the top of the existing flexible packaging material 40. A die cut is applied through the flexible packaging material 40 on a bottom surface thereof proximate the overlap of the cover 44. The cover or reseal label 44 provides a hermetic seal. This process is continued and the processed flexible packaging material is rewound such that each lower lid 40 and cover 44 combination is ready for installation on a container with the use of sealing equipment. In this fashion, less material is used and costs are reduced due to reduced packaging size compared with other types of resealable solutions. Furthermore, such a seal provides air and moisture tight resealability for wide variety of applications.

Figure 12:
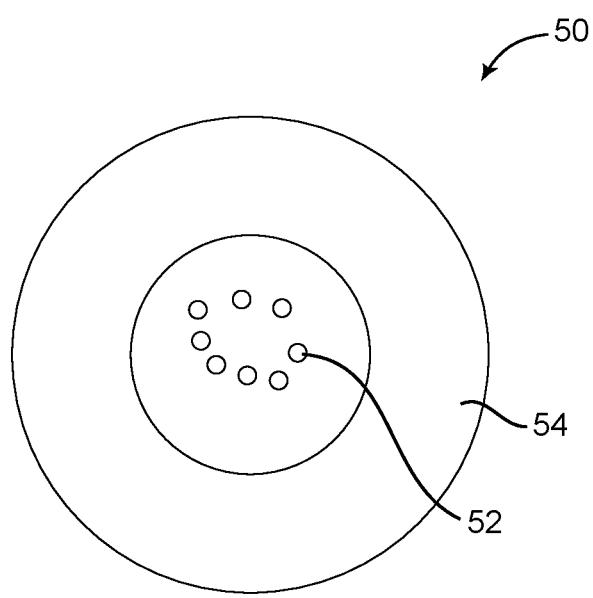
FIG. 12 illustrates an alternative embodiment of a bottom of a bowl of the present invention.
Figure 13:
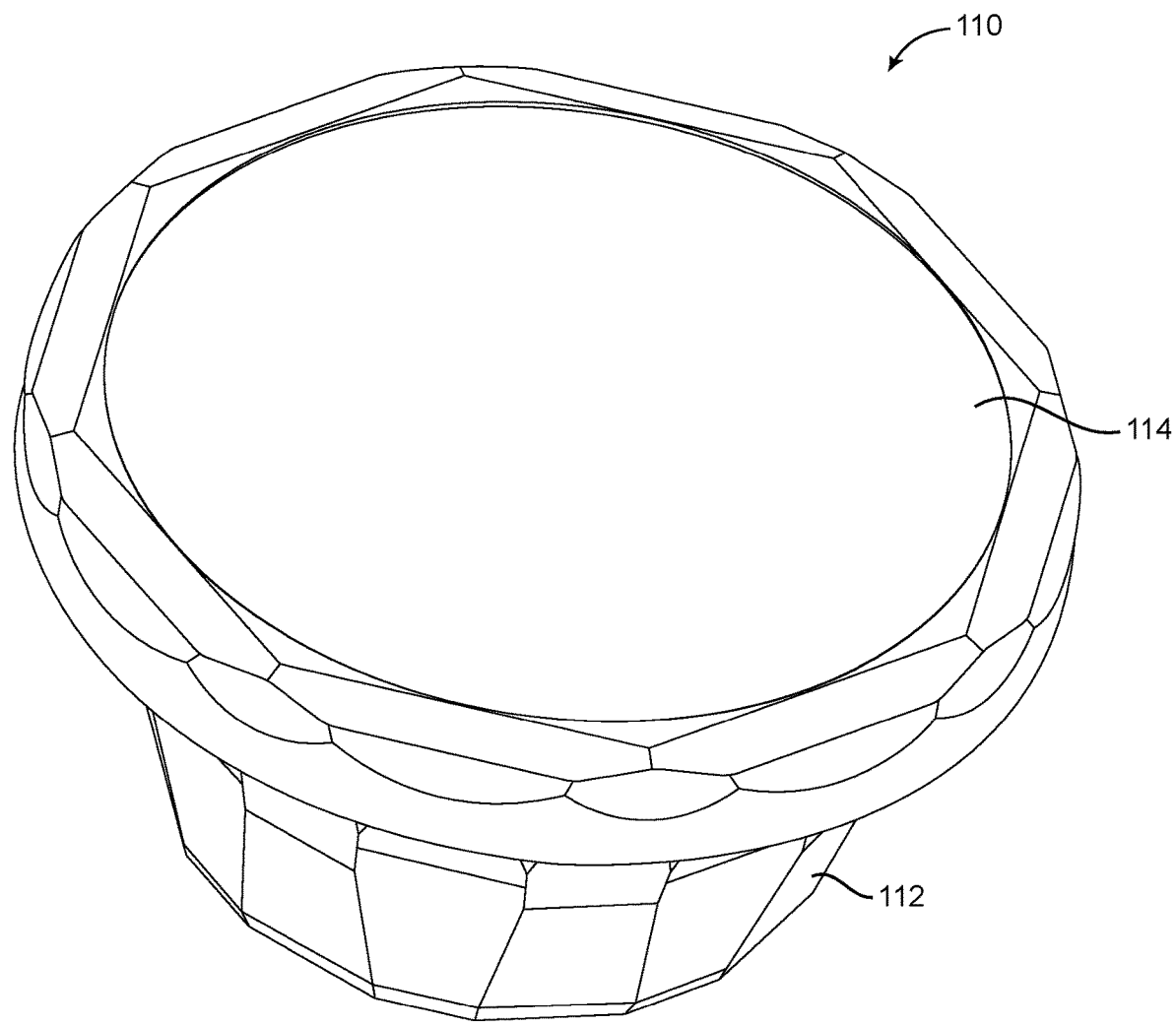
FIG. 13 illustrates a top front side perspective view of another alternative embodiment of the container of the present invention.
Figure 14:
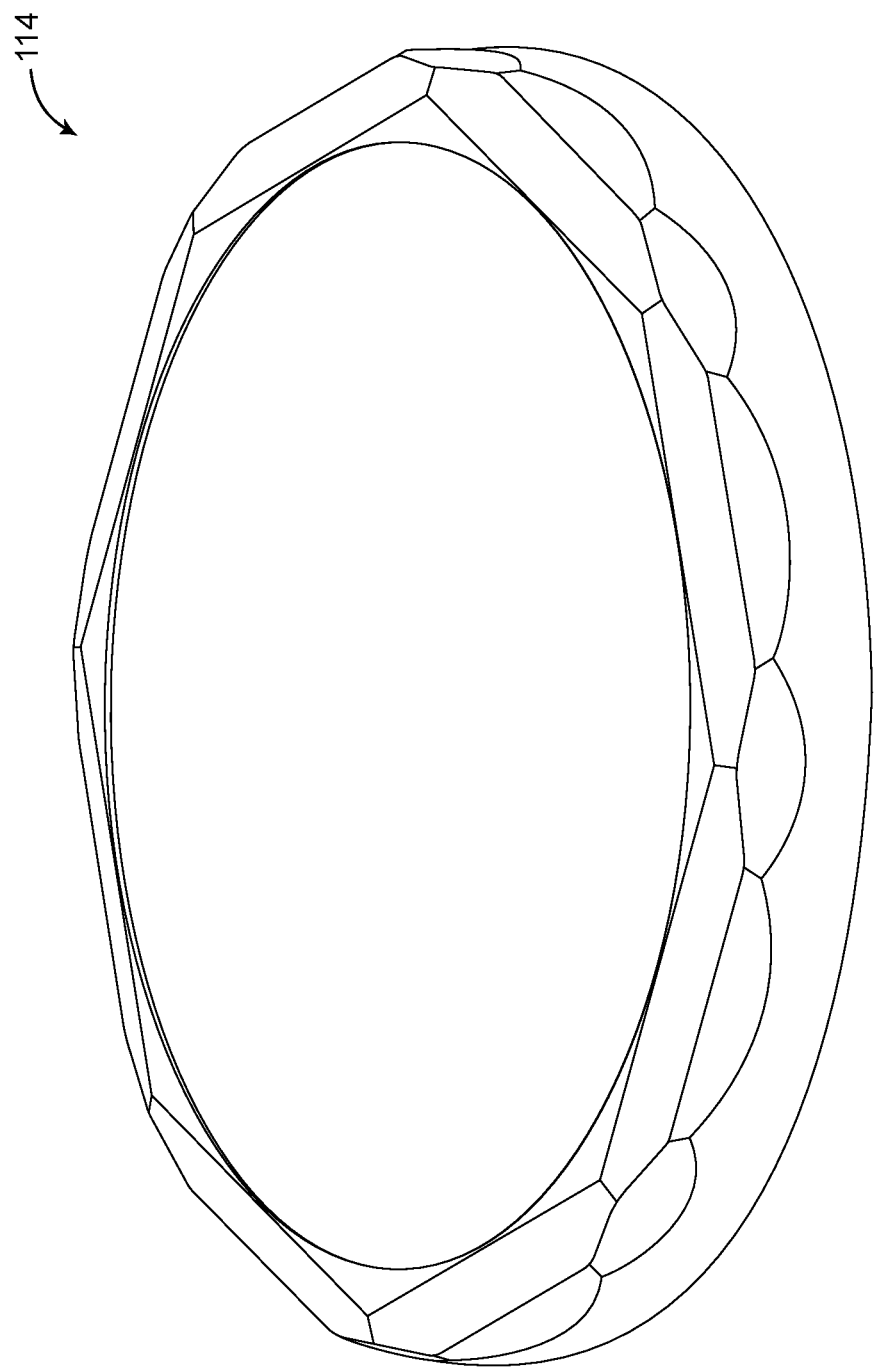
FIG. 14 illustrates a top front perspective view of an upper lid of the container of FIG. 13.
Figure 15:
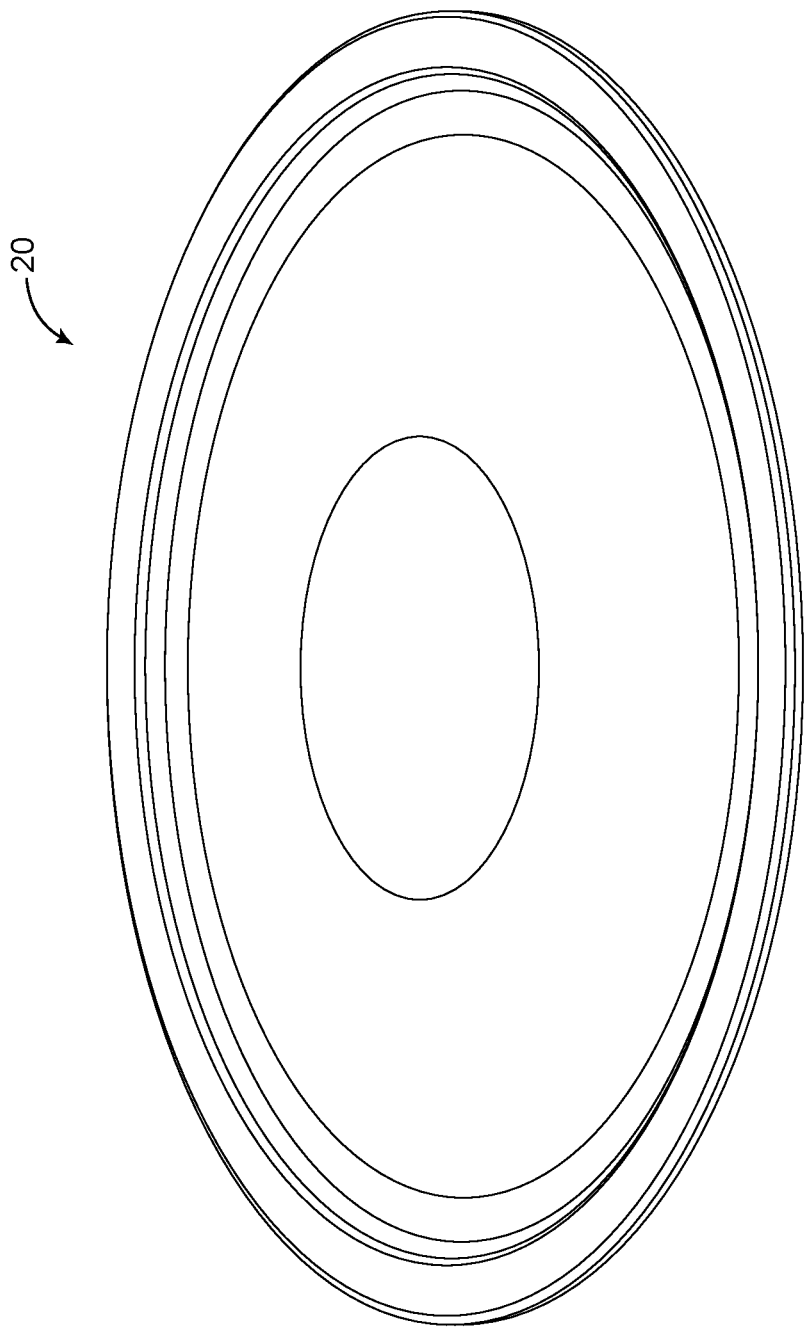
FIG. 15 illustrates a top front perspective view of an intermediate lid of the container of FIG. 2.
Figure 16:
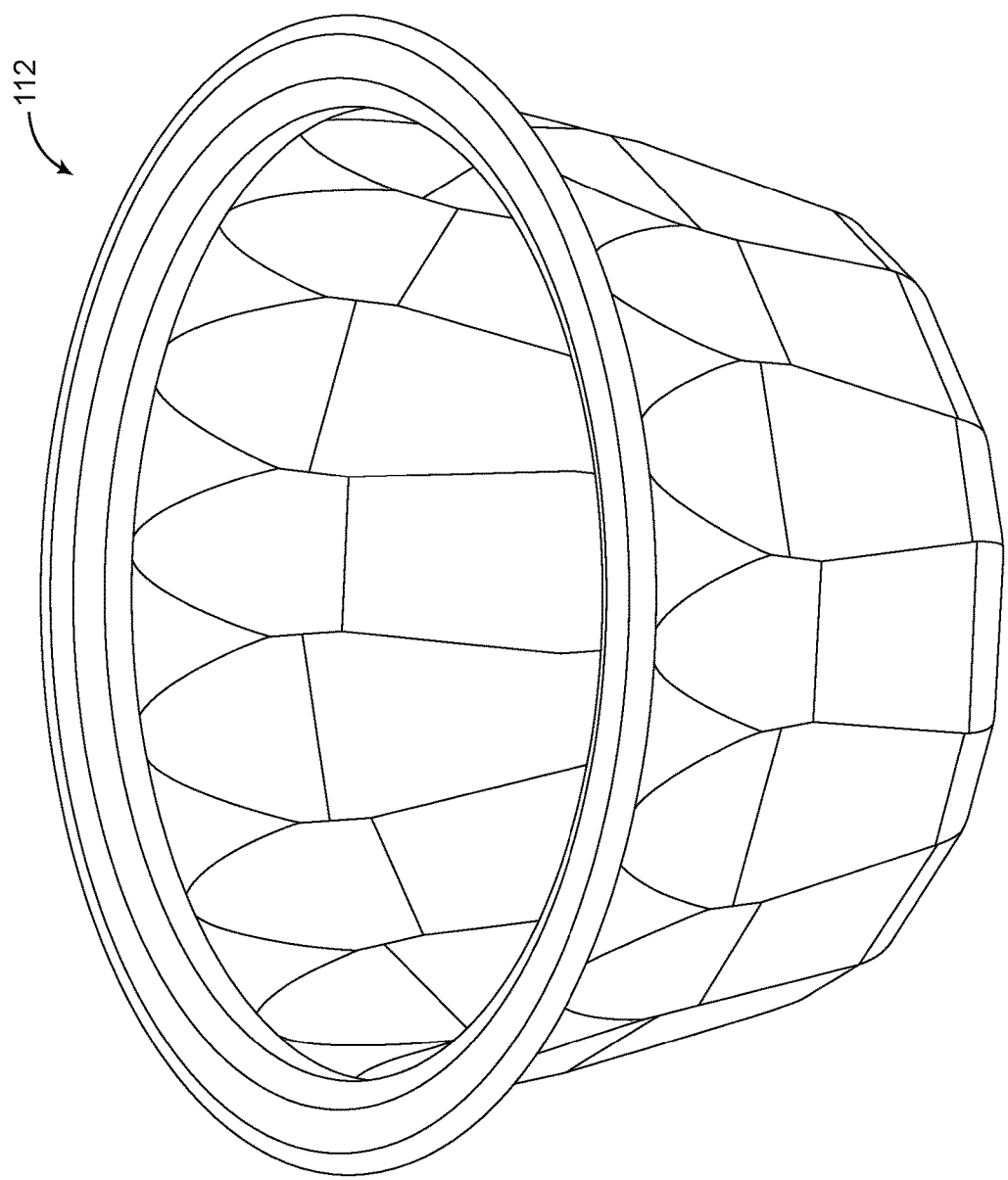
FIG. 16 illustrates a top front perspective view of a bowl of the container of FIG. 13.
Figure 17:
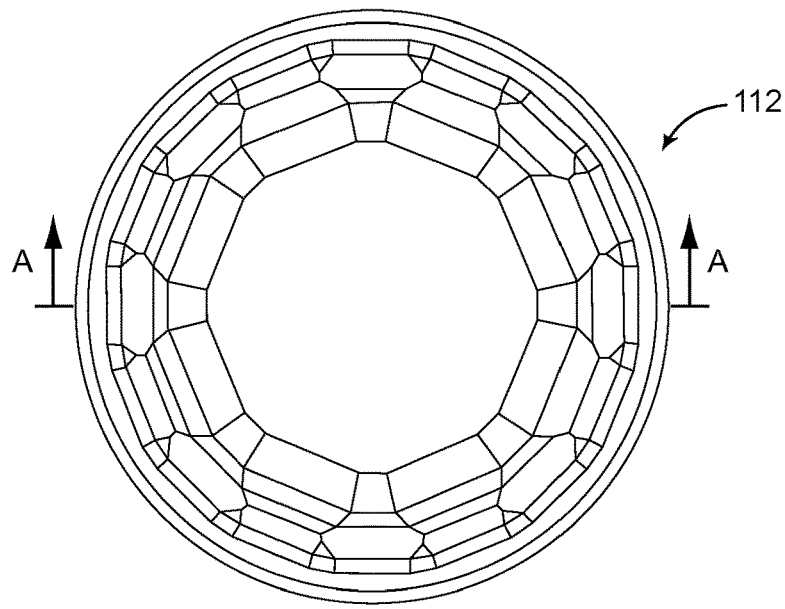
FIG. 17 illustrates a top plan view of the bowl of FIG. 16.
Figure 18:
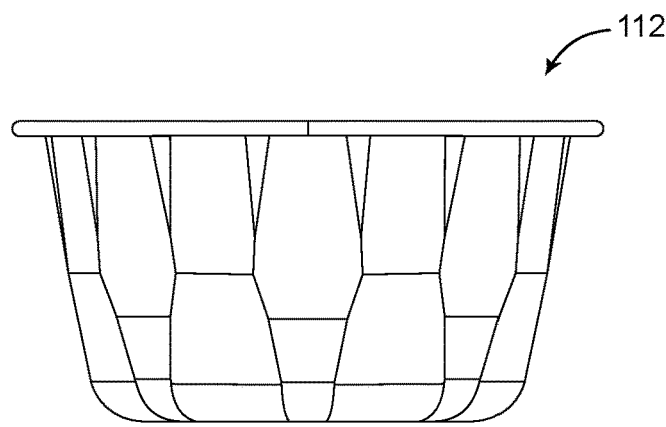
FIG. 18 illustrates a front plan view of the bowl of FIG. 16.

The embodiments shown in the figures may also be configured for a single-use operation, and so the lids 14, 20, 26 may be removed and disposed of, allowing the stored substances to be completely accessed. In an alternative embodiment, shown in FIG. 12, a user could form apertures on top and bottom portions of the bowl 12 so that, for example, when tobacco is stored in the interior 30 of the bowl 12, it may be possible to smoke the tobacco while the tobacco remains in the bowl 12. Other substances besides tobacco may be stored in and used in the bowl 12, such as hemp, incense, and essential oils. In this embodiment of the container 10, as shown in FIG. 12, the container 10 includes a lower lid 40 as shown in FIG. 11 and a bowl 50 having at least one aperture 52 on a bottom surface. The lower lid 40 is constructed of a non-flammable metal such as aluminum or tin. Alternatively, the lower lid 40 is constructed from other known materials, such as plastic. The at least one aperture 52 is covered with a bottom cover 54 via adhesive. In use, a user removes the cover 44 from the lower lid 40 and the bottom cover 54 from the bowl 50. The bowl 50 is then inserted into a smoking or burning device and the contents within the bowl 50 are burned. In an alternative embodiment, the lower lid 40 in FIG. 11 could be manufactured without an aperture and removed completely when in use.

Figure 19:
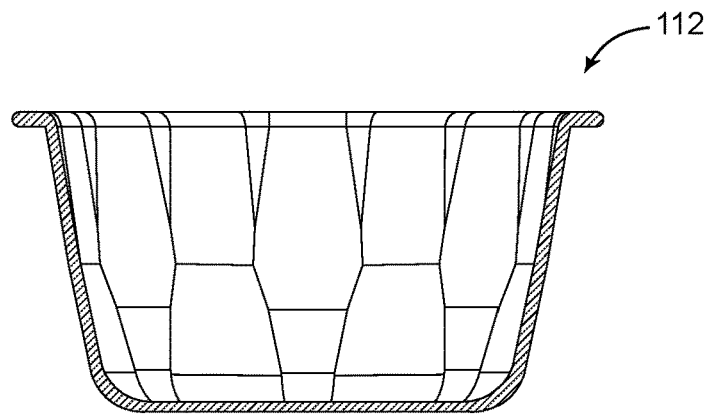
FIG. 19 illustrates a cross-sectional view of the bowl of FIG. 16 along lines A-A in FIG. 17.
Figure 20:
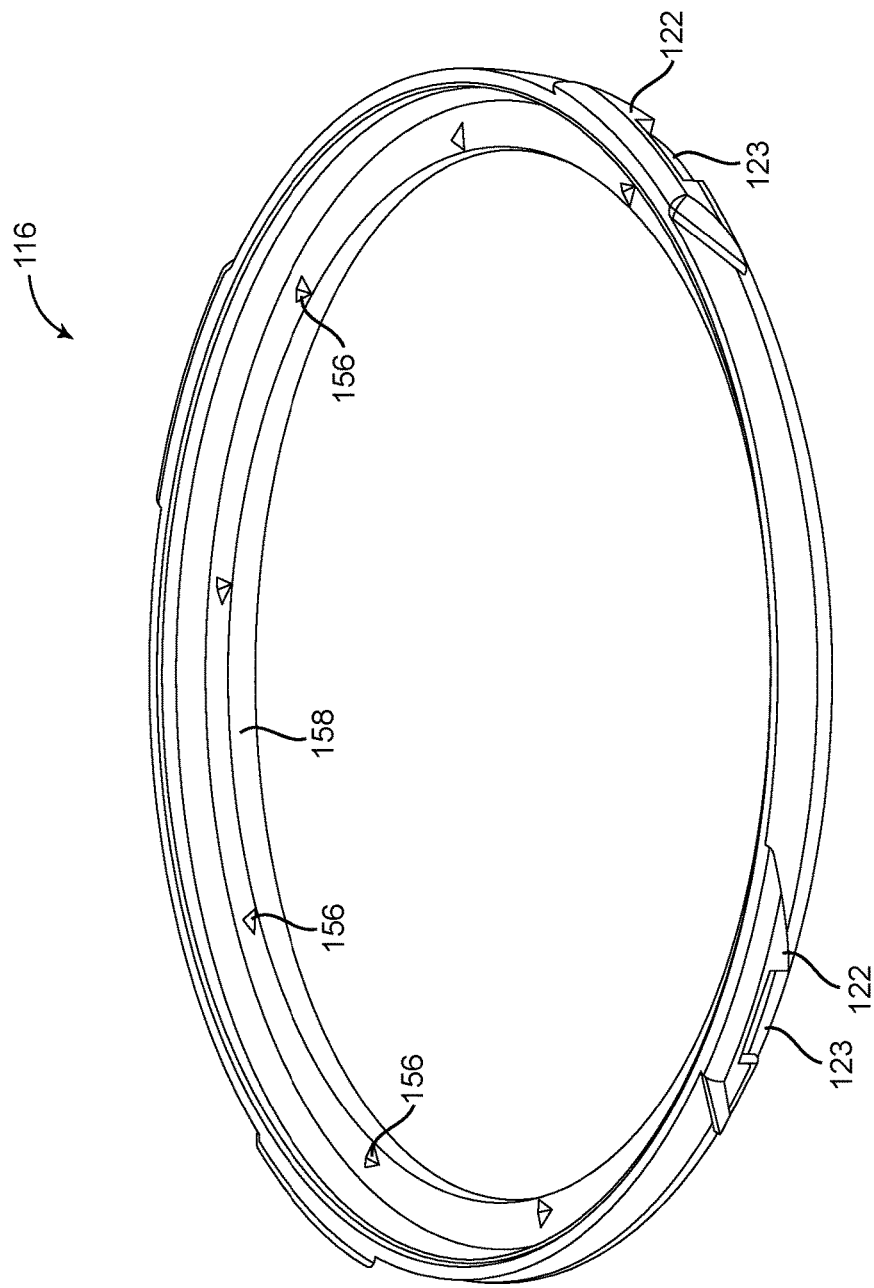
FIG. 20 illustrates a top front perspective view of the child-proofing ring of FIG. 5.
Figure 21:
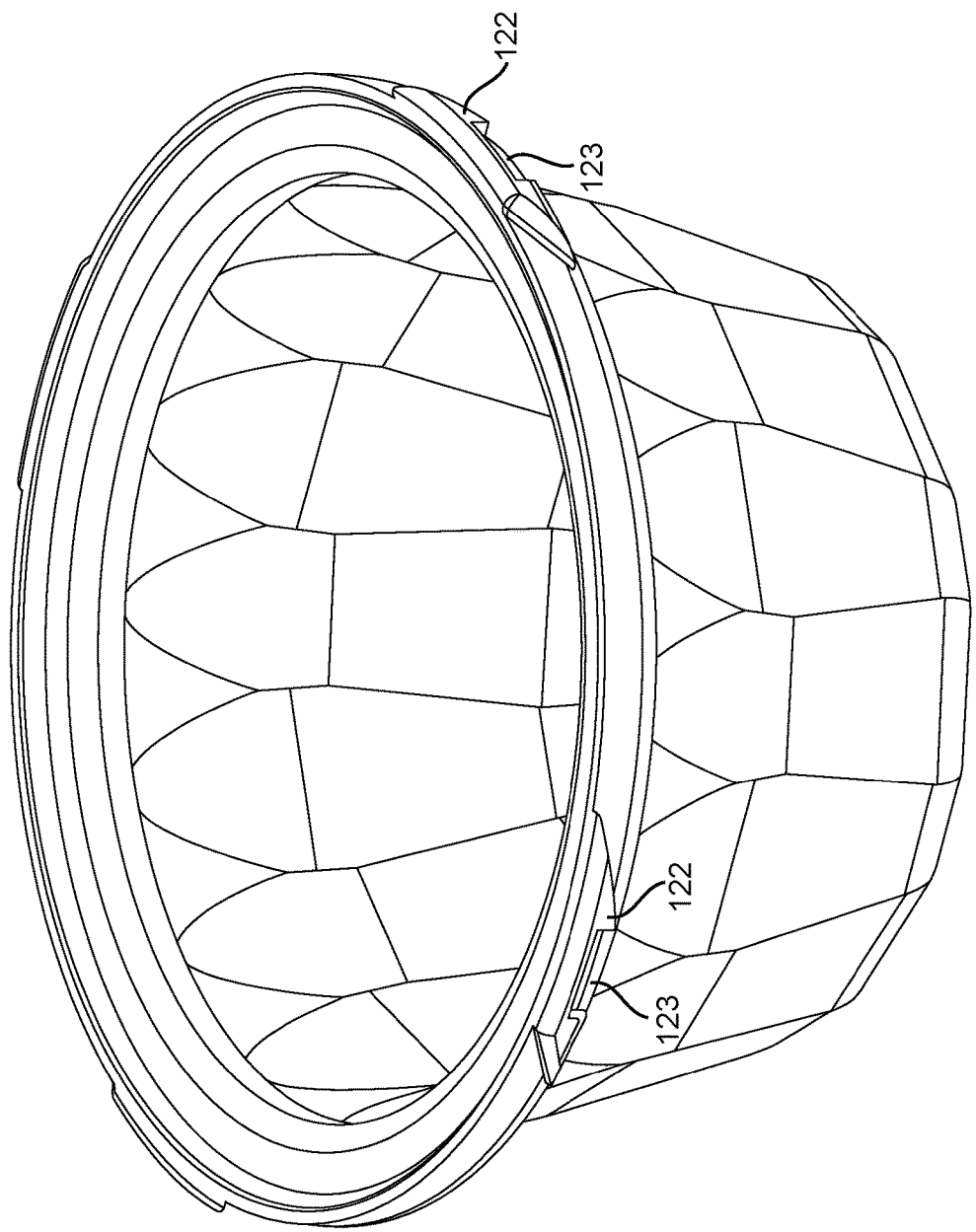
FIG. 21 illustrates a top front perspective view of the bowl of FIG. 16 assembled with the child-proofing ring of FIG. 20.
Figure 22:
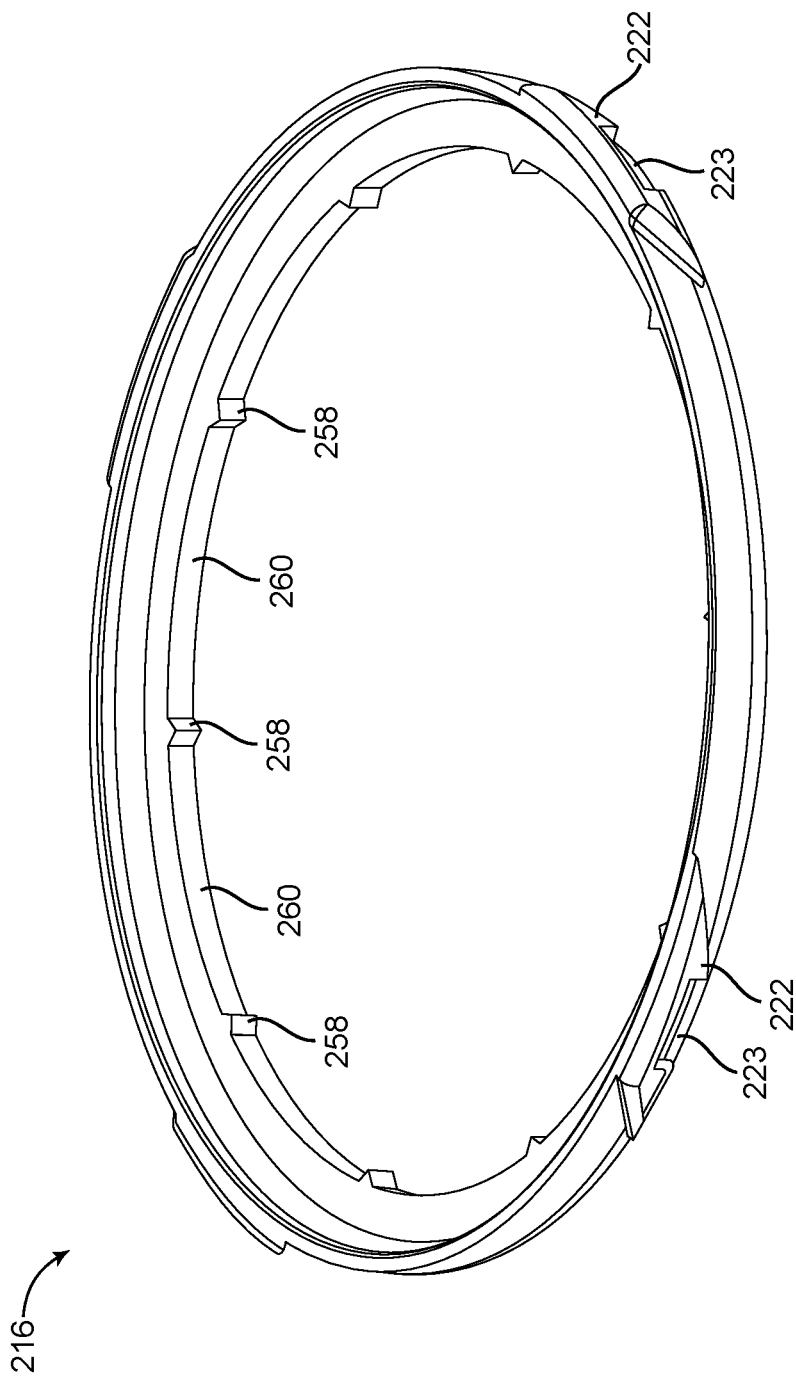
FIG. 22 illustrates a top front perspective view of an alternative embodiment of the child-proofing ring of FIG. 5.
Figure 23:
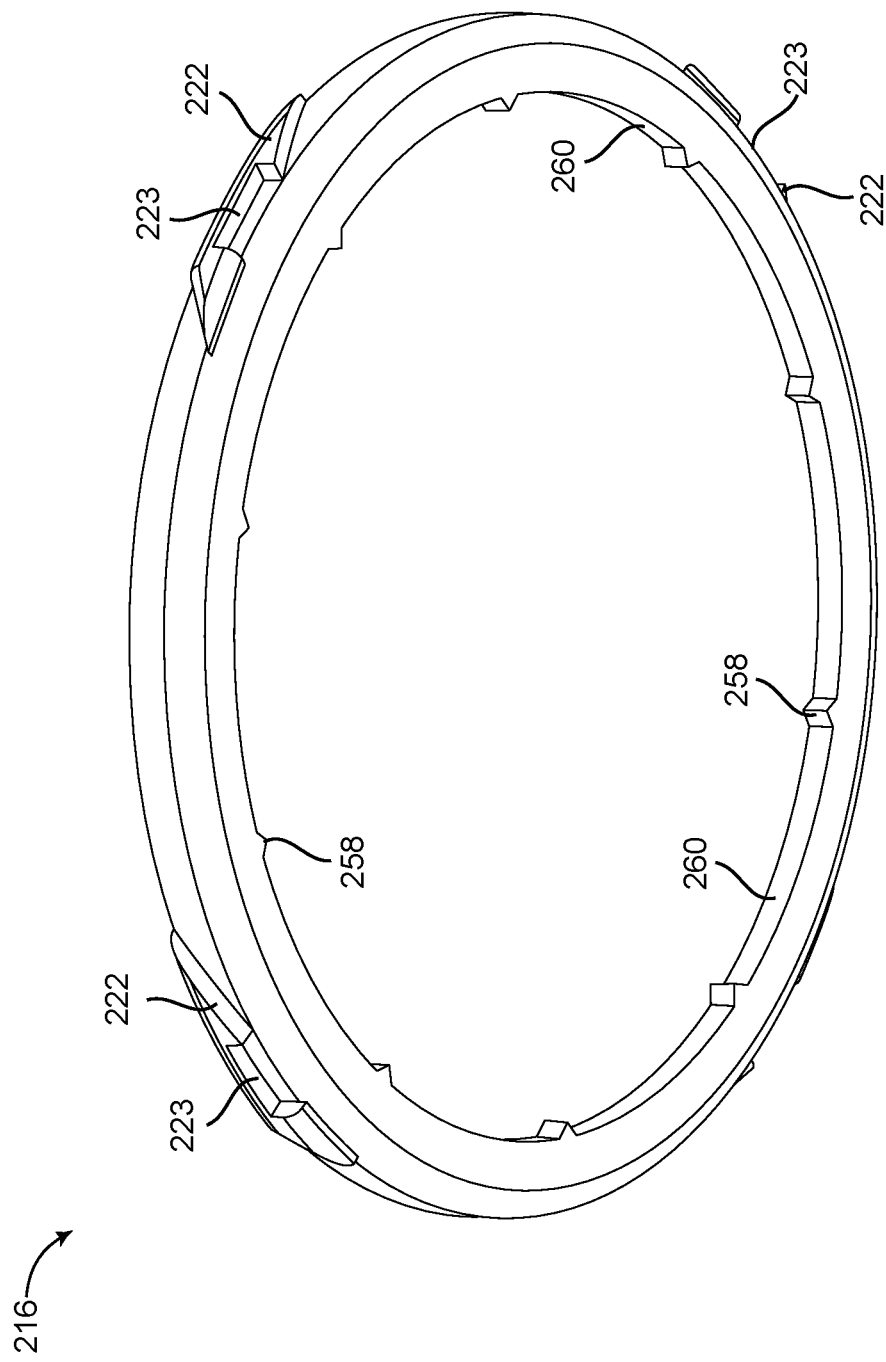
FIG. 23 illustrates a bottom front perspective view of the alternative embodiment of FIG. 22.
Figure 24:
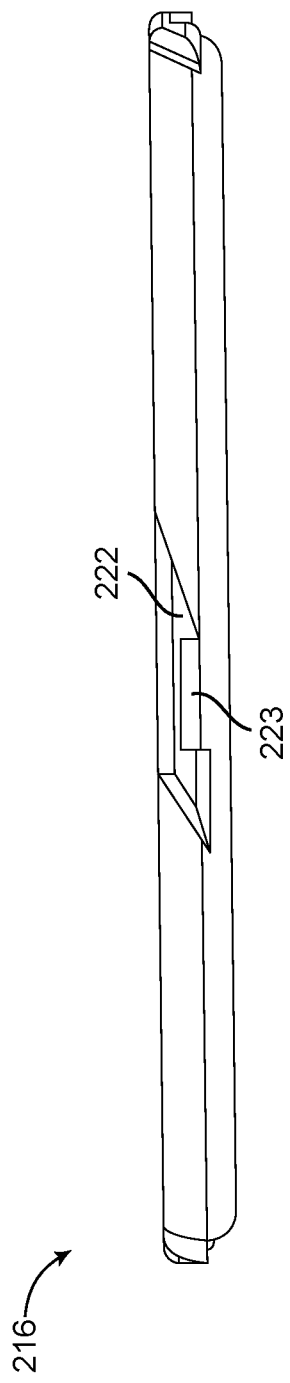
FIG. 24 illustrates a side plan view of the alternative embodiment of FIG. 22.
Figure 25:
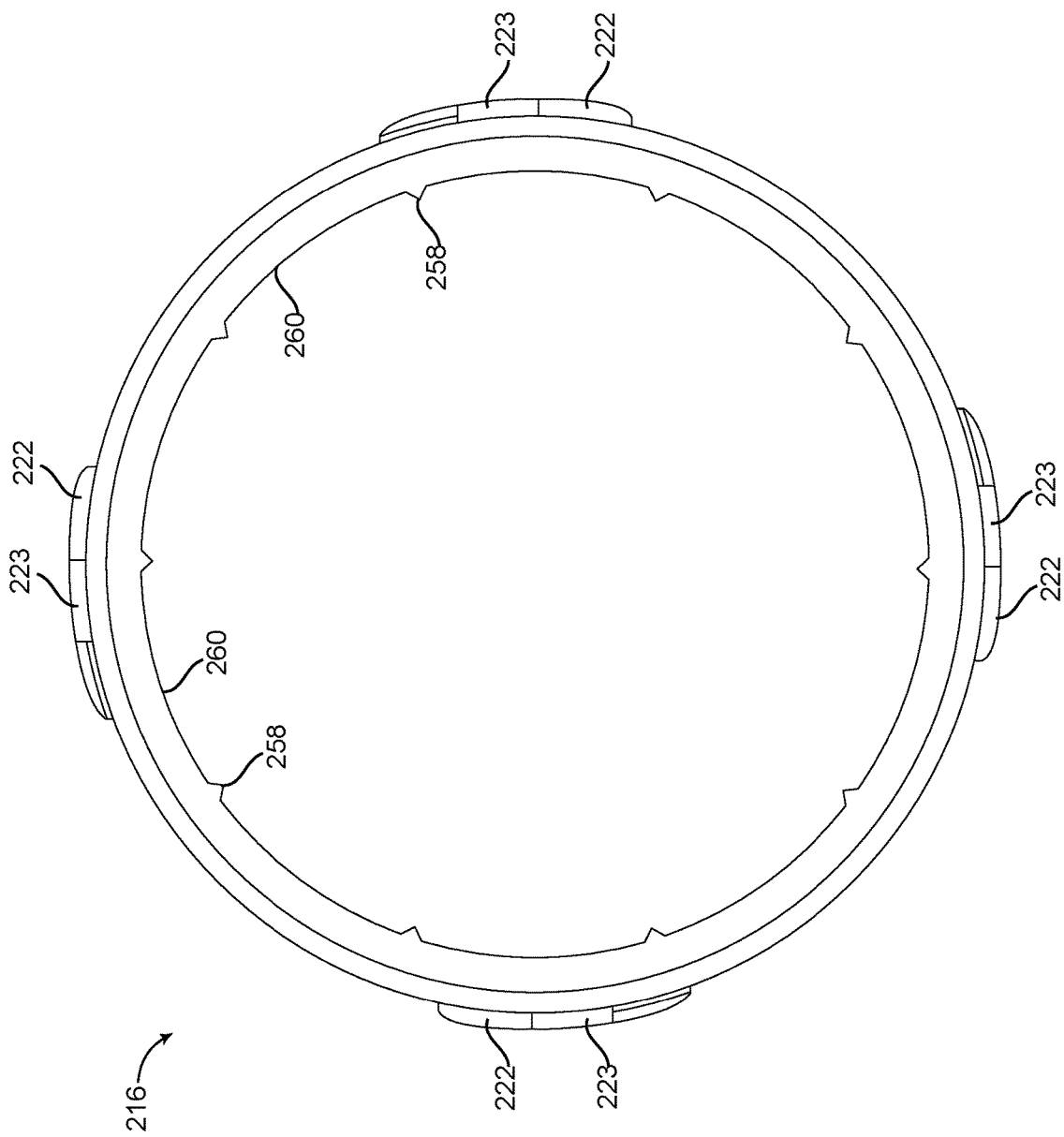
FIG. 25 illustrates a bottom plan view of the alternative embodiment of FIG. 22.

In an alternative embodiment, FIGS. 13-21 illustrate a container 110 having a bowl 112 with an upper lid 114 thereupon. An intermediate lid 20, shown in FIG. 15 which corresponds to the intermediate lid 20 in FIGS. 1-2 and 4, is disposed between the upper lid 114 and the bowl 112. FIG. 19 illustrates a cross-sectional view of the bowl 112 of FIG. 16 along lines A-A in FIG. 17. The bowl 112 has a lip 118. As shown in FIG. 20, a child-proofing ring 116 has a plurality of detents 122 and a plurality of slots 123 for engaging corresponding tabs on the underside of the upper lid 114. The child-proofing ring 116 is capable of being positioned under the lip 118 of the bowl 112. As shown in FIG. 21, the ring 116 is friction fit under the lip 118 of the bowl 112 such that the ring 116 is fixed thereto. Referring to FIG. 20, small nubs or detents 156 are included on an inner lip 158 of the ring 116, and are oriented upward, with such nubs 156 biting under the lip 118 of the bowl 112 and providing sufficient friction to keep the ring 116 from spinning about the bowl 112 without distorting the sealing area of the lip 118 of the bowl 112.

Figure 6:
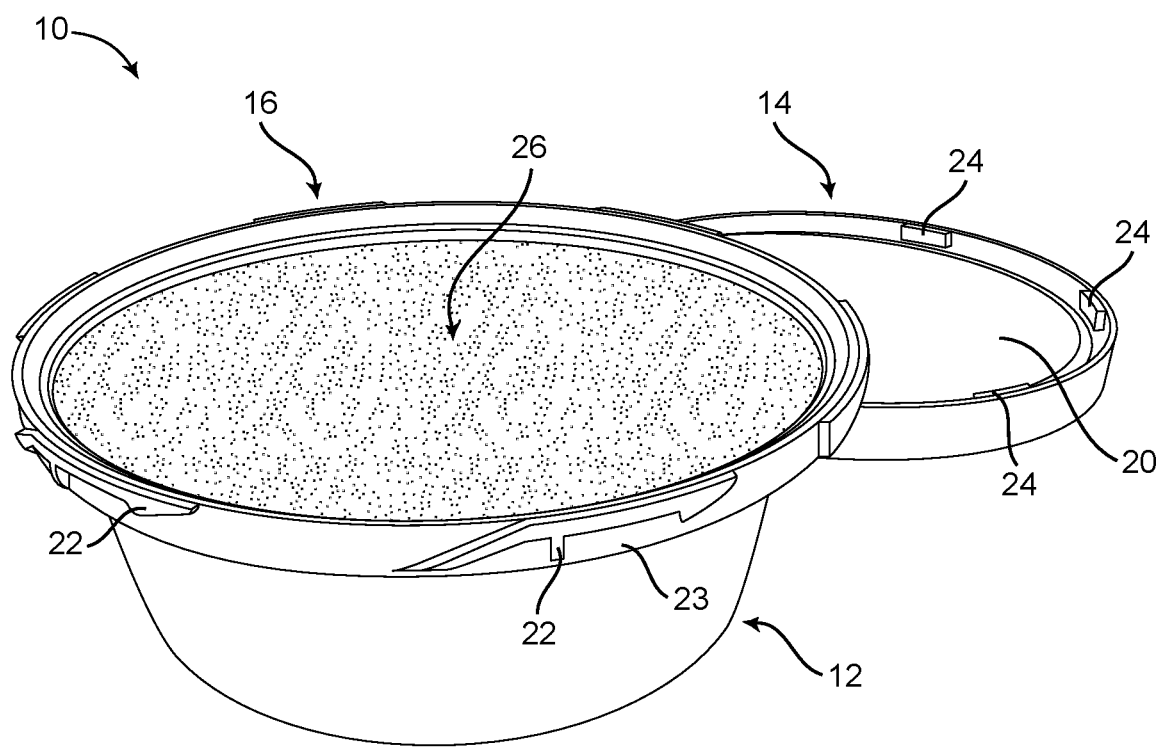
FIG. 6 illustrates a top front perspective view of the container of FIG. 2 with an upper lid removed.
Figure 7:
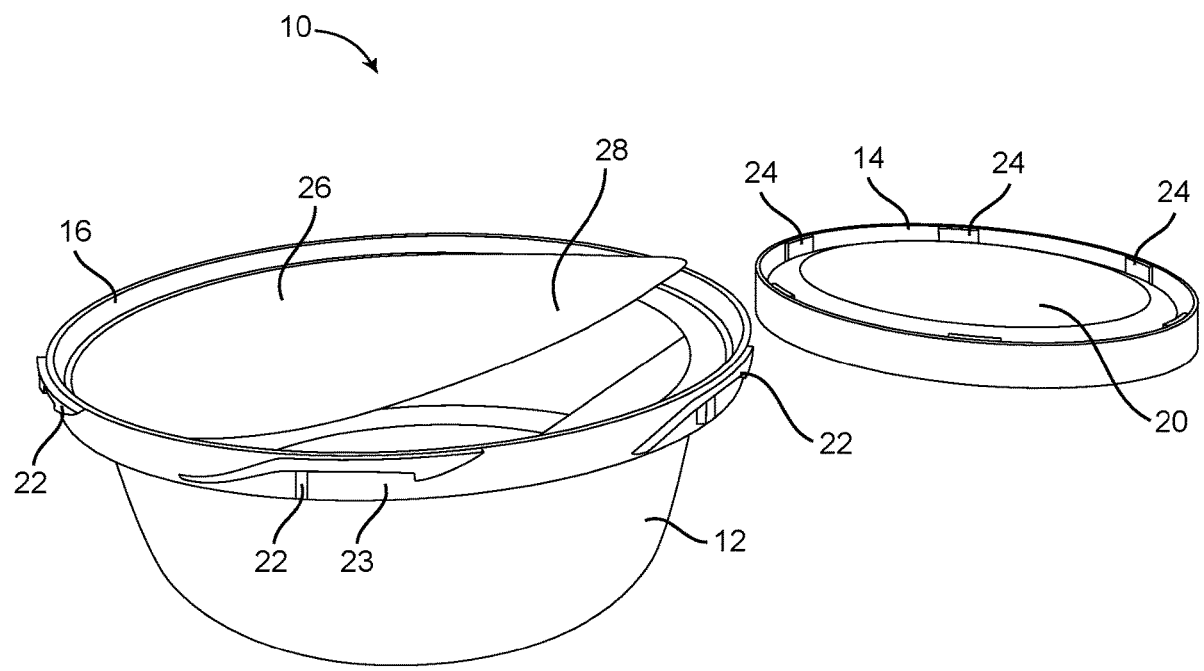
FIG. 7 illustrates a top front perspective view of the container of FIG. 6 with a portion of a lower lid being partially lifted.
Figure 8:
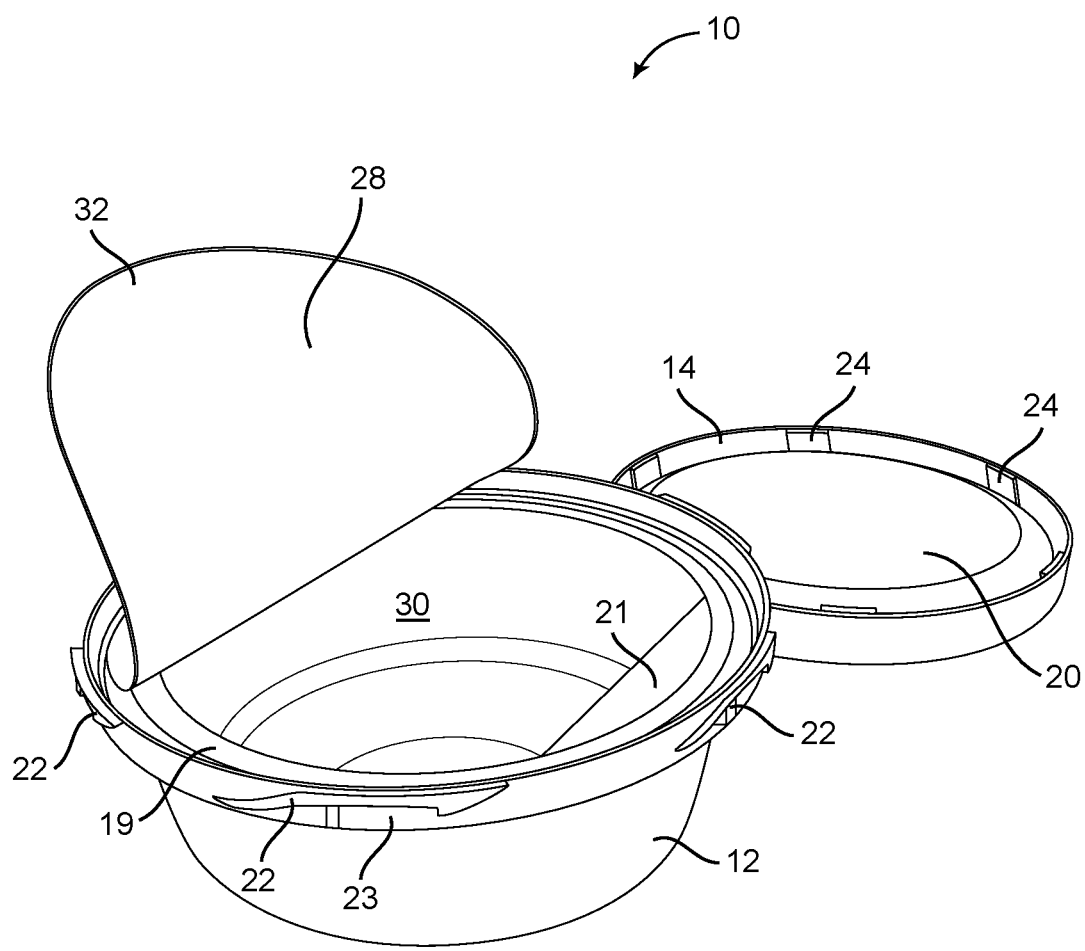
FIG. 8 illustrates a top front perspective view of the container of FIG. 6 with the portion of the lower lid being substantially lifted.

In a further alternative embodiment as shown in FIGS. 22-25, the child-proof ring 216 includes a plurality of interior points 258 which extend inward from an inner surface 260 of the ring 216. In this alternative embodiment, the underside of each interior point 258 engages the bowl 12, as shown in FIG. 6, to bite or otherwise provide friction between the interior points 258 of the ring 216 and an outer side wall 12a of the bowl 12, which may be composed of aluminum. Such friction is sufficient so that the bowl 12 is prevented from spinning relative to the ring 216, or equivalently, the ring 216 is prevented from spinning relative to the bowl 12.

The child-proof ring 216 also includes a plurality of detents 222, with a slot 223 formed within each detent 222. The detents 222 engage complementary tabs 24 on an underside of the upper lid 14, as described above. The number of detents 222 and corresponding tabs 24 could be varied. When locked, each tab 24 is positioned within a slot 223. To unlock, a user must push down on the upper lid 14 to provide a downward force on the ring to disengage the tab 24 from the slot 223 to unlock the ring 216 from the upper lid 14, and then to rotate the upper lid 14, for example, counter-clockwise such that the tabs 24 are positioned below the detents 222 and the tabs 24 are released from the slots 223. The upper lid 14 and child-proofing ring 216 are constructed with a recyclable material such as plastic but other recyclable materials such as metals could be used.

Figure 26:
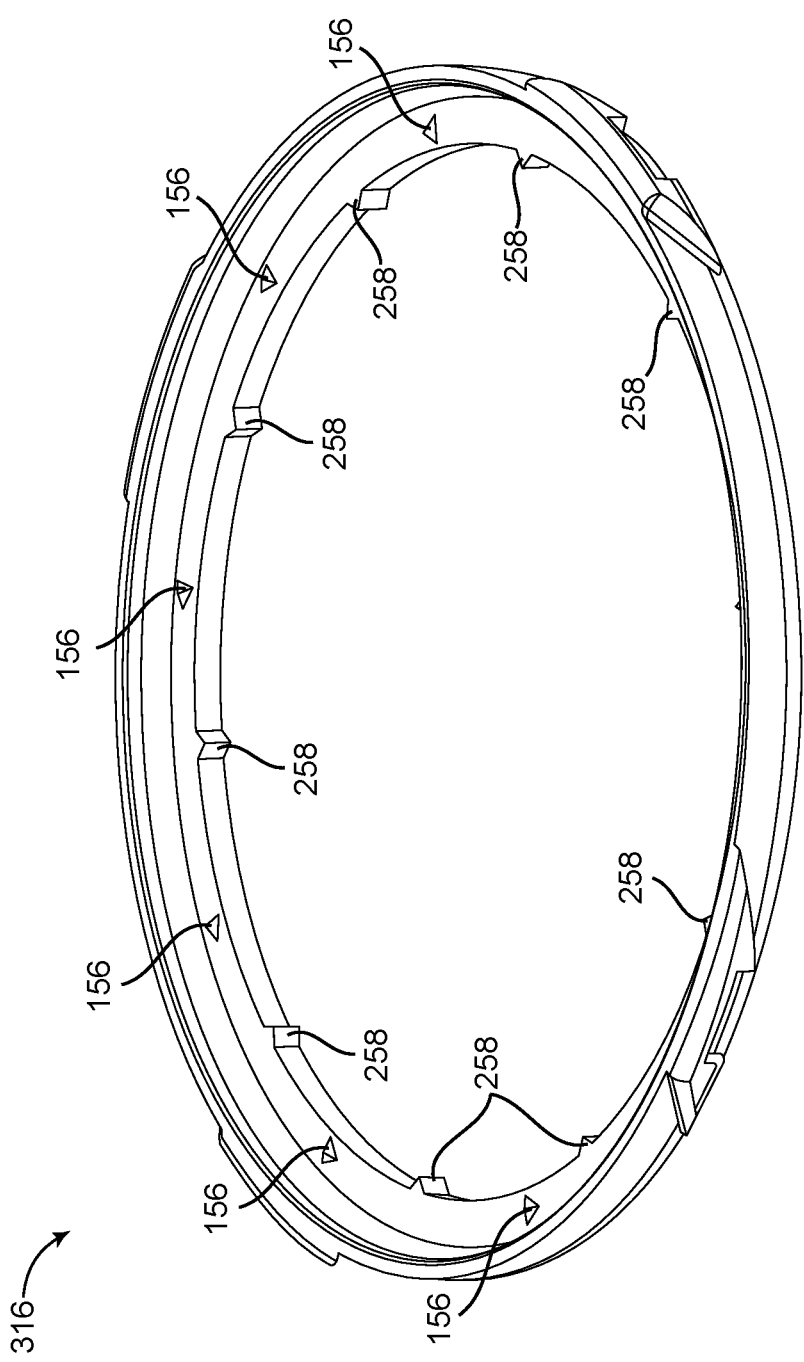
FIG. 26 illustrates a top front perspective view of an alternative embodiment of a child-proofing ring.

Alternatively, as shown in FIG. 26, the ring 316 could include both upwardly extending detents 156 as well as inwardly extending detents 258 for frictionally securing the ring 316 to the bottom of the bowl lip 18 (see, e.g., FIG. 1) and the outer side wall 12a of the bowl 12, respectively.

The present invention may be embodied in other specific forms without departing from its spirit or essential characteristics. The described embodiments are to be considered in all respects only as illustrative and not restrictive. The scope of the invention, therefore, will be indicated by claims rather than by the foregoing description. All changes, which come within the meaning and range of equivalency of the claims, are to be embraced within their scope.

What is claimed is:

1. A container comprising:
   a bowl having:
      a plurality of walls forming an interior for storing a substance; and
      a lip having an engagement surface on a top surface of at least one of the plurality of walls;
   a lower lid having a bottom surface, with the lower lid removably coupled to the plurality of walls for accessing the substance when the lower lid is in an open configuration, wherein the lower lid in the open configuration is resealable on the plurality of walls to be in a closed configuration to seal the substance within the interior of the bowl;
   an adhesive on the bottom surface for resealing the lower lid in the open configuration to be in the closed configuration;
   an upper lid for retaining the substance within the interior of the bowl and the lower lid;
   a ring disposed adjacent to a portion of the bowl and engageable with the upper lid for establishing a child-resistant engagement between the upper lid and the bowl; and
   an intermediate lid coupled to a lower side of the upper lid and positioned on the lip to engage the top of the lip, wherein the intermediate lid pushes against the engagement surface for locking the upper lid and the ring together.

2. The container of claim 1, wherein each of the bowl, the lower lid, and the upper lid is composed of a biodegradable material.

3. The container of claim 1, wherein each of the bowl, the lower lid, and the upper lid is composed of a recyclable material.

4. The container of claim 1, wherein the portion of the bowl includes the lip; and
   wherein the ring is disposed under the lip.

5. The container of claim 4, wherein the ring engages the lip in a friction fit.

6. The container of claim 5, wherein the ring includes a detent for engaging the lip in the friction fit.

7. A container comprising:
   a bowl having an engagement surface and an interior for storing a substance;
   an upper lid having a lower side, with the upper lid retaining the substance in the interior of the bowl;
   a ring disposed adjacent to a portion of the bowl and engageable with the upper lid for establishing a child-resistant engagement between the upper lid and the bowl;
   an intermediate lid adjacent to the lower side of the upper lid for pushing against the engagement surface for locking the upper lid and the ring together, and
   an openable lower lid for accessing the substance when the lower lid is in an open configuration, wherein the lower lid in an open configuration is resealable to be in a closed configuration, wherein the substance is sealed within the bowl.

8. The container of claim 7, wherein the lower lid includes an adhesive for resealing the lower lid in an open configuration to be in a closed configuration.

9. The container of claim 7, wherein each of the bowl, the lower lid, the upper lid, and the ring is composed of a biodegradable material.

10. The container of claim 7, wherein each of the bowl, the lower lid, the upper lid, and the ring is composed of a recyclable material.

11. The container of claim 7, wherein the portion of the bowl includes a lip; and
    wherein the ring is disposed under the lip.

12. The container of claim 11, wherein the ring engages the lip in a friction fit.

13. The container of claim 12, wherein the ring includes a detent for engaging the lip in the friction fit.

14. A container comprising:
    a bowl having an interior for storing a substance;
    an openable lower lid for accessing the substance when the lower lid is in an open configuration; and
    an upper lid for retaining the substance within the interior of the bowl and the lower lid;
    wherein the lower lid includes an adhesive for resealing the lower lid in an open configuration to be in a closed configuration; and a ring disposed adjacent to a portion of the bowl and engageable with the upper lid for establishing a child-resistant engagement between the upper lid and the bowl.

15. The container of claim 14, wherein the lower lid in the open configuration is resealable to be in a closed configuration, wherein the substance is sealed within the bowl.

16. The container of claim 14, wherein each of the bowl, the lower lid, and the upper lid is composed of a biodegradable material.

17. The container of claim 14, wherein each of the bowl, the lower lid, and the upper lid is composed of a recyclable material.

18. The container of claim 14, further comprising:
an intermediate lid coupled to a lower side of the upper lid;
wherein the bowl has an engagement surface, with the intermediate lid pushing against the engagement surface for locking the upper lid and the ring together.

* * * * *